United States Patent [19]

Yamamoto et al.

[11] Patent Number: 4,856,048
[45] Date of Patent: Aug. 8, 1989

[54] MOBILE COMMUNICATION SYSTEM

[75] Inventors: Koji Yamamoto; Akihisa Nakajima, both of Tokyo; Hiroshi Sawada, Iruma; Noriteru Shinagawa, Tokorozawa; Jiro Itano, Tokyo, all of Japan

[73] Assignee: Nippon Telegraph and Telephone Corporation, Tokyo, Japan

[21] Appl. No.: 162,062

[22] Filed: Feb. 29, 1988

[30] Foreign Application Priority Data

Mar. 2, 1987 [JP] Japan ................................. 62-46963

[51] Int. Cl.[4] ............................................. H04Q 7/04
[52] U.S. Cl. ........................................ 379/60; 455/33; 379/63
[58] Field of Search ................... 379/60, 63, 58, 56, 379/59; 455/33, 54, 52

[56] References Cited

U.S. PATENT DOCUMENTS 4,284,848   8/1981   Frost ..................... 379/63

FOREIGN PATENT DOCUMENTS 01071269  8/1986  Japan .................... 379/60

OTHER PUBLICATIONS

ISS 1984 Florence, May 7-11, 1984, Session 32B, Paper 4, pp. 1-7.

Primary Examiner—Robert Lev
Attorney, Agent, or Firm—Frishauf, Holtz, Goodman & Woodward

[57] ABSTRACT

A mobile communication system comprises at least one mobile switching center for accommodating through respective networks a plurality of radio base stations each having an independent radio zone area, the mobile switching center being connected to a telephone through a wire speech path, a mobile station connectable to each of the radio base stations through a radio speech channel; and a multi-connecting device contained in the mobile switching center and having a network between the switching center and an old base station left by the mobile station during communication, a network between the mobile switching center and a new base station entered by the mobile station, and a wire speech path between the mobile switching center and the telephone. When the mobile station moves across adjacent radio zone areas of base stations during communication, the mobile switching center detects the movement of the mobile station to cause the multi-connecting device to multi-connect the aforementioned networks and wire speech path so that a channel is changed while maintaining the communication of the mobile station.

9 Claims, 8 Drawing Sheets

MOBILE COMMUNICATION SYSTEM

BACKGROUND OF THE INVENTION

This invention relates to a mobile communication system in which a radio speech channel is switched between radio zone areas while keeping the communication of a mobile station.

The mobile communication system comprises, as is well known, a plurality of base stations each having an independent radio zone area, a plurality of mobile switching centers which accommodate the base stations through wire speech path, and a mobile station connectable through a radio speech channel to any one of the base stations. With this mobile communication system the mobile station can move across the radio zone areas during communication to communicate with a telephone subscriber.

In such a mobile communication system, where the mobile station moves to a new radio zone area accommodated by a different mobile switching centers during a conversation, and a situation happens in which the conversation cannot be continued through the radio speech channel used up to now, it is needed to change the radio speech channel in use to a new radio speech channel for the new base station while continuing the conversation.

Figure 1:
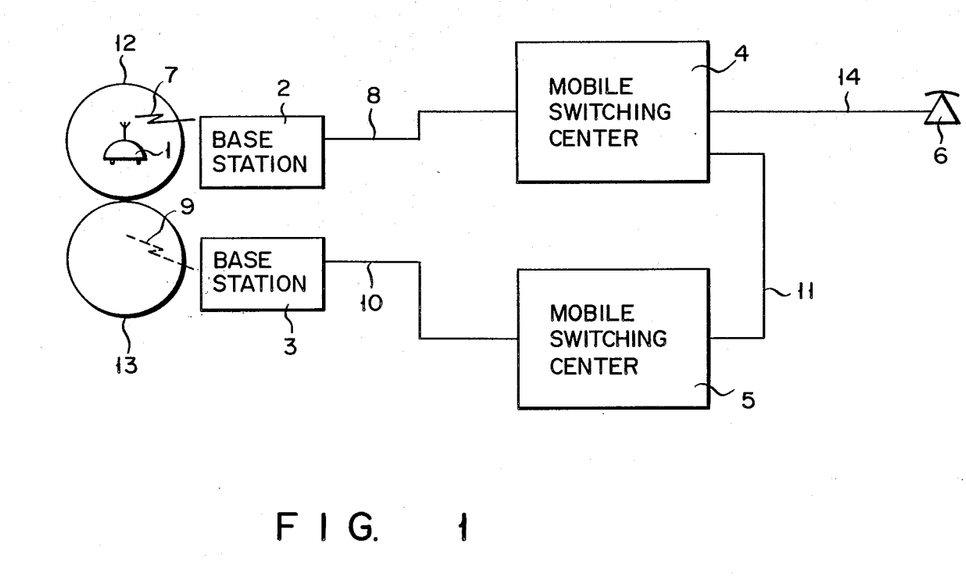
FIG. 1 is a block diagram for explaining a conventional system for handover.

With reference to FIG. 1, an explanation is made of a handover used in mobile switching centers used in a conventional mobile communication system. This is described in a paper entitled "Nation-wide automobile telephone service using new tracking exchange technology," by T. Goto and T. Eto, which was published in International Switching Symposium '84, Session 32B-4, Florence, 1984.

When a mobile station 1 moves from a radio zone area 12 to a radio zone area 13 during communication with a stationary telephone 6 in a public switched telephone network through radio speech channel 7, an idle radio speech channel 9 in radio zone area 13, and wire speech path 10 and 11 are determined. Specifically, wire speech path 11 is set up in mobile switching center 4, while wire speech path 10 is set up in mobile switching center 5. Mobile switching center 4 instructs mobile station 1 through base station 2 used up to now to switch its radio speech channel (frequency) 7 to a radio speech channel (frequency) 9 assigned to base station 3. After the channel switching the instructed mobile station 1 relays that the radio speech channel has been switched to mobile switching center 4 via base station 3, wire speech path 10, mobile switching center 5, and wire speech path 11. Consequently mobile switching center 4 switches the connection path for a subscriber's wire speech path 14 of stationary telephone 6 from wire speech path 8 to wire speech path 11 which is connected to the new base station 3, wire speech path 10, and mobile switching center 5. And then, mobile switching center 4 releases wire speech path 8 connected between it and the old base station 2.

It is to be noted that, in the above described system, mobile station 1 may be applied to, for example, an automobile, ship, and airplane, if they have a telephone installed.

In the case of the system for effecting handover as described above, however, at a time when the switching is accomplished from the old radio speech channel 7 to the new radio speech channel 9, wire speech path 14 connected to telephone 6 remains connected in mobile switching center 4 to base station 2 via wire speech path 8. This means that the communication path between mobile station 1 and stationary telephone 6 is cut off. Thus, the conversation will be cut off until the connection procedure of subscriber's wire speech path 14 from wire speech path 8 to wire speech path 11 is completed in mobile switching center 4.

Further, the conversation cut-off time, which lasts from the time mobile station 1 switches its channel up to the time the wire speech path is switched in mobile switching center 4, involves a signal transmission delay time between the mobile switching centers. Thus, where a common control signaling system is used between the mobile switching centers the conversation cut-off time will depend on the traffic on control signal lines. In the worst case it is inevitable that the cut-off time becomes extremely long.

SUMMARY OF THE INVENTION

It is accordingly a primary object of this invention to provide a mobile communication system capable of channel switching while keeping a mobile station in a communication condition after the switching of the radio speech channel by a mobile station and thus reducing a communication cut-off time occurring when the handover is effected.

According to the present invention a mobile communication system is provided which comprises at least one mobile switching center for accommodating through respective networks a plurality of base stations each having an independent radio zone area, said mobile switching center being connected to a telephone through a wire speech path; a mobile station connectable to each of said base stations through a radio speech channel; and multi-connecting means included in said mobile switching center for multi-connecting, during a communication of the mobile station, a network between the mobile switching center and an old base station left by the mobile station during communication, a network between the mobile switching center and a new or destination base station entered by the mobile station, and a wire speech path between the mobile switching center and the telephone; the process of a handover comprising the steps of: detecting by said mobile switching center, when said mobile station moves across adjacent radio zone areas of two base stations during communication, a radio speech channel in the destination radio zone area; multi-connecting by said multi-connecting means a network between said mobile switching center and the old base station and a network between said mobile switching center and the new base station and a wire speech path between the mobile switching center and the telephone after the detection of the radio channel as a channel change; and switching the radio speech channel to be used by said mobile station from the radio speech channel in the old zone area to the radio speech channel in the new zone area while keeping the communication condition of said mobile station.

According to the mobile communication system of this invention, the channel switching can be effected from the radio speech channel in the old radio zone area to the radio speech channel in the destination radio zone area while keeping the communication condition of the mobile station after the switching of the radio speech channel by a mobile station, so that the communication is not interrupted. For example, qualitative comparisons revealed that for the common-line signaling system of 4.8 Kb/s the communication cut-off time is reduced to about one third that of the conventional system, while in the case of 48 Kb/s the cut-off time is reduced to about one half.

Further, the mobile communication system of this invention has an advantage that the common channel signal link capability between mobile switching centers does not affect the communication cut-off time.

DETAILED DESCRIPTION OF THE PREFERRED EMBODIMENT

Figure 2:
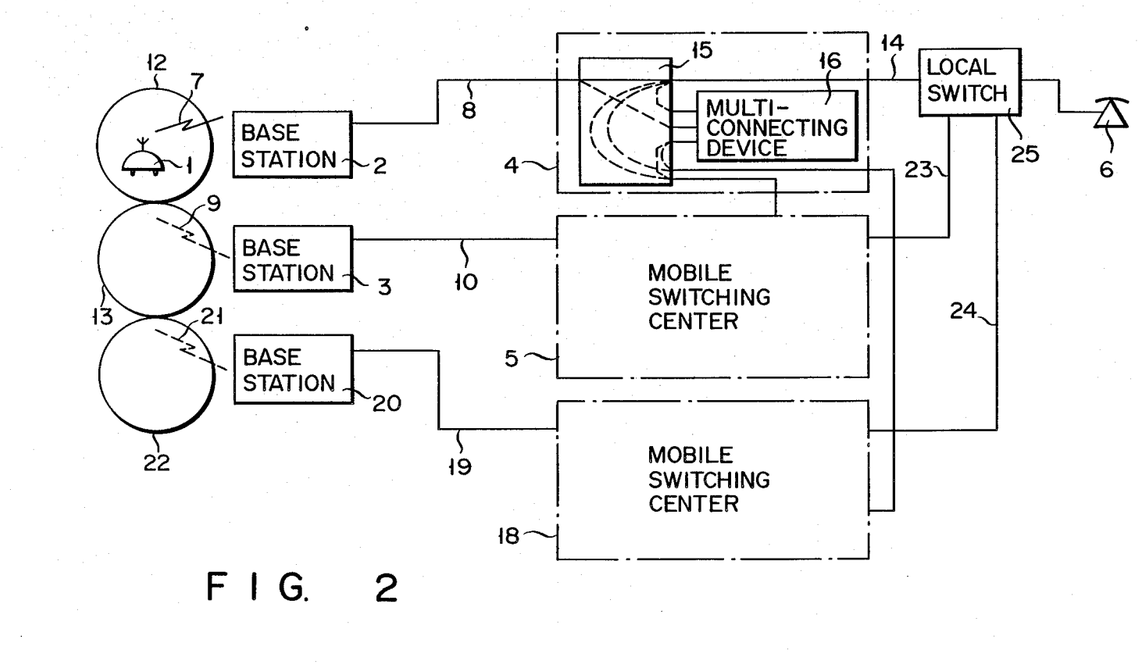
FIG. 2 is a block diagram for explaining an embodiment of a mobile communication system of this invention.

Referring now to FIG. 1, 1 designates a mobile station, 2 and 3 base stations, 4 and 5 mobile switching center, 6 a stationary telephone, 7 a radio speech channel, 8 a wire speech path, 9 a radio speech channel, 10 and 11 wire speech path, 12 and 13 radio zone areas, 14 a wire speech path, 15 a communication path switch, 16 a multi-connecting device, 17 a wire speech path, 18 a mobile switching center, 19 a wire speech path, 20 a base station, 21 a radio speech channel, and 22 a radio zone area. It is to be noted that base station 3 and wire speech path 10 and mobile switching center 5 and wire speech path 11, taken together, can be referred to as a network. Likewise, base station 20, line 19, mobile switching center 18 and wire speech path 17, taken together, can be referred to as a network. The telephone may be of a fixed or movable type. Mobile switching center 4, 5 and 18 are connected to local switch 25 via respective wire speech path 14, 23 and 24.

The operations of the handover channel switching system arranged as described above will be described below with respect to first through fourth operational cases.

(The first case)

This is the case where mobile station 1 moves from radio zone area 12 to radio zone area 13 while holding a conversation with stationary telephone 6.

That is, in this first case, while communicating with stationary telephone 6 via radio speech channel 7, base station 2, wire speech path 8, mobile switching center 4, and wire speech path 14, when mobile station 1 moves from radio zone area 12 to radio zone area 13, radio zone area 13, base station 3, and mobile switching center 5 are determined by means of an existing technique. Mobile switching center 4 determines and acknowledges wire speech path 11 to mobile switching center 5 to instruct mobile communication exchange 5 to connect with base station 3. Mobile switching center 5 determines and sets up wire speech path 10 to base station 3. Base station 3 determines an idle radio speech channel 9 in radio zone area 13, and then relays information on the idle radio speech channel 9 to the mobile switching center 4 via mobile switching center 5 after the new radio speech channel 9 is ready for transmission and reception of signals from mobile station 1. Upon reception of the information on the idle radio speech channel 9 mobile switching center 4 controls communication path switch 15 in order to release the connection between wire speech paths 8 and 14 and to connect wire speech paths 8, 11 and 14 to multi-connecting device 16. By the connection to multiconnecting device 16 signals transmitted from telephone 6 are distributed to wire speech paths 8 and 11, and signals to be transmitted through wire speech paths 8 and 10 to telephone 6 are added for subsequent transmission to wire speech path 14.

Mobile switching center 4 informs base station 2 of the new radio speech channel 9 which is in turn relayed to mobile station 1 via the old radio speech channel 7. As a result mobile station 1 changes its radio speech channel from the old radio speech channel 7 to the new radio speech channel 9. At this time, mobile station 1 is connected to telephone 6 via radio speech channel 9, wire speech paths 10 and 11, multi-connecting device 16, and wire speech path 14 so that a conversation is held between mobile station 1 and stationary telephone 6.

Figure 3:
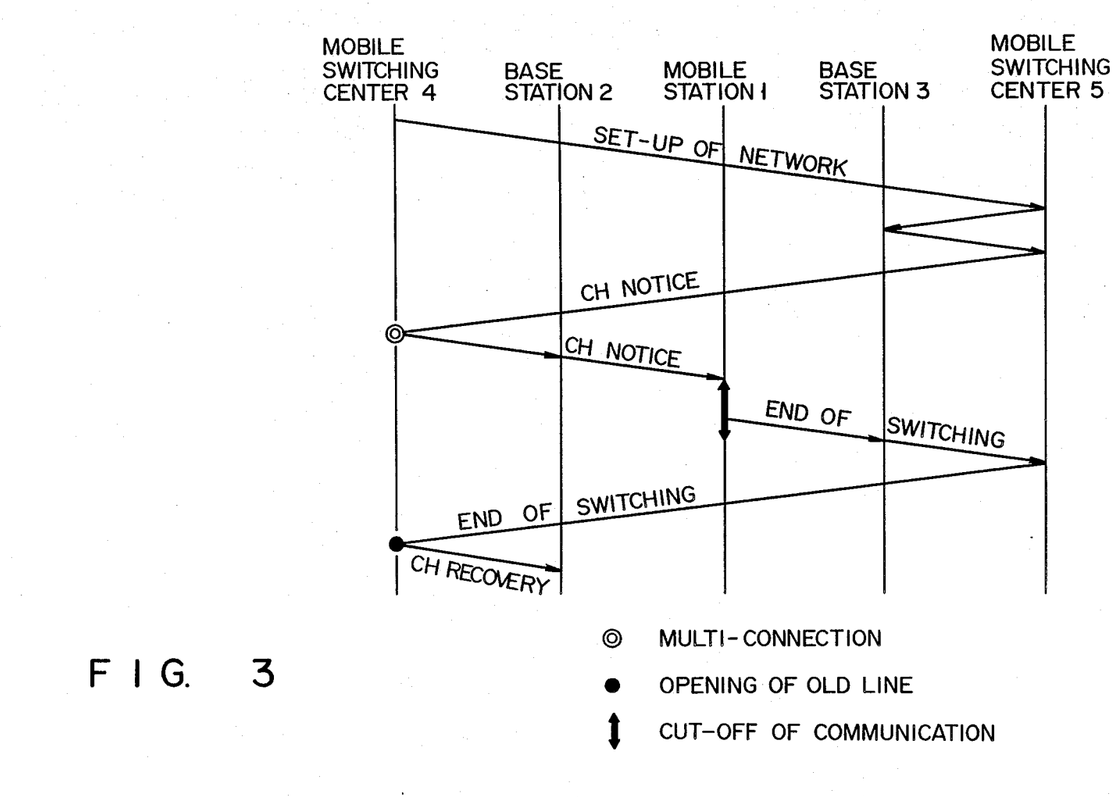
FIG. 3 shows a control sequence for handover in connection with a first operational case in the mobile communication system of FIG. 2.

When mobile station 1 changes its radio speech channel to radio speech channel 9, base station 3 detects the radio speech channel switching completion, which is in turn relayed to mobile switching center 4 via mobile switching center 5. Consequently, mobile switching center 4 controls communication path switch 15 to release multi-connecting device 16, connect wire speech path 14 to wire speech 11, and interrupt wire speech path 8. Base station 2 releases the old radio speech channel 7. The control sequence of the first case is shown in FIG. 3.

As is evident from the first case described above, the handover system of this invention has an advantage that the communication is not interrupted after the radio speech channel is switched because the radio speech channel is switched while maintaining the condition capable of communicating with a telephone subscriber through either the present radio speech channel or the new radio speech channel.

Further, this invention provides another advantage that a signal transmission delay time between the mobile switching center and a signal efficiency of the common control signaling system have no effect on the communication cut-off time.

(The second case)

This is the case where mobile station 1 returns from radio zone area 13 to radio zone area 12.

That is, while communicating with stationary telephone 6 via radio speech channel 9, base station 3, wire speech path 10, mobile switching center 5, wire speech paths 11 and 14, when mobile station 1 moves from radio zone area 13 to radio zone area 12, radio zone area 12, base station 3, and mobile switching center 4 are determined by means of the existing technique. Mobile switching center 5 informs mobile switching center 4 of effecting the handover again. Consequently, mobile switching center 4 sets up wire speech path 8 to base station 2. Base station 2 determines the idle radio speech channel 7 in radio zone area 12 and then relays information on the idle radio speech channel 7 to mobile switching center 4 after mobile station 1 is ready for transmission and reception of signals through the new radio speech channel 7. Mobile switching center 4 controls communication path switch 15 in order to release the connection between wire speech paths 11 and 14, and to connect wire speech paths 8, 11 and 14 to multi-connecting device 16. By this connection to multi-connecting device 16 signals transmitted from telephone 6 are distributed to wire speech paths 8 and 11, and signals to be transmitted through wire speech paths 8 and 10 to telephone 6 are added together and then fed to wire speech path 14.

Next, mobile switching center 4 informs base station 3 of the new radio speech channel 7 which is in turn relayed to mobile station 1 via the old radio speech channel 9. As a result mobile station 1 changes its radio speech channel from the old radio speech channel 9 to the new radio speech channel 7. At this time, mobile station 1 is connected to telephone 6 via radio speech channel 7, wire speech path 8, multi-connecting device 16, and wire speech path 14 so that a conversation is held between mobile station 1 and stationary telephone 6.

When mobile station 1 changes its radio speech channel to radio speech channel 7, base station 2 detects the radio speech channel switching completion, which is in turn relayed to mobile switching center 4. Consequently, mobile switching center 4 controls communication path switch 15 to release multi-connecting device 16, wire speech path 14 to communication line 8, and interrupt wire speech path 11. Base station 3 releases the old radio speech channel 9 when mobile switching center 5 interrupts the wire speech path 10.

Figure 4:
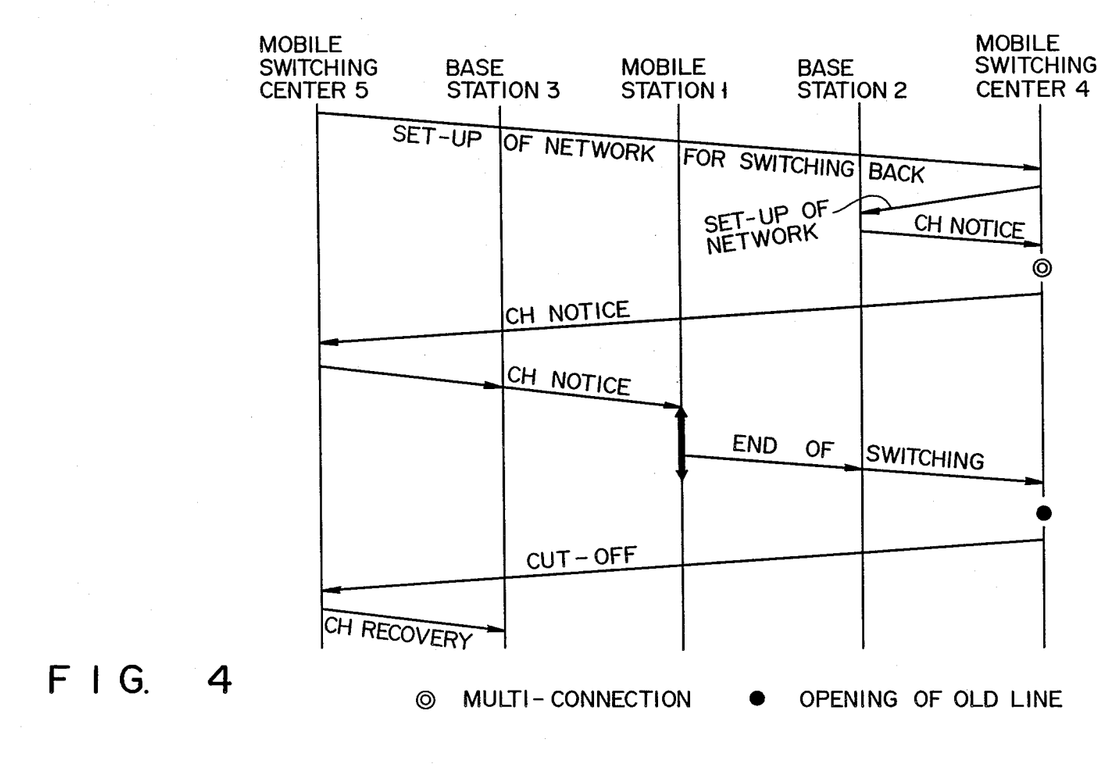
FIG. 4 shows a control sequence for handover in connection with a second operational case in the mobile communication system of FIG. 2.

To summarize the handover system in the second case, the mobile station moves again to the radio zone area accommodated by the old (destination) mobile switching center in the above-described first case after the handover of the first case has been completed with the result that the handover is effected again. This is noticed by the former mobile switching center to the destination mobile switching center. Subsequently, the destination mobile switching center multi-connects the wire speech path between the destination mobile switching center and the destination base station and the wire speech path between the former mobile switching center and the destination mobile switching center. And the mobile station changes its radio speech channel from the radio speech channel in the former radio zone area to the radio speech channel in the destination radio zone area without interrupting its communication. The control sequence for the second case is shown in FIG. 4.

For the second case as described above the multi-connection is carried out in the new or destination mobile switching center, thus reducing the communication cut-off as in the first case so that the handover is realized without the use of a separate wire speech path between mobile switching centers.

(The third case)

This is the case where the mobile station 1 moves from radio zone area 12 to radio zone area 13, and then to radio zone area 22. The operations performed when the mobile station moves from radio zone area 12 to radio zone area 13 are the same as those described previously. Thus, only the operations carried out when the mobile station moves from radio zone area 13 to radio zone area 22 will be described below.

Radio zone area 22, base station 20 and mobile switching center 18 are determined by means of the existing techniques when mobile station 1 moves from radio zone area 13 to radio zone area 22 during communication with stationary telephone 6 via radio speech channel 9, base station 3, wire speech path 10, mobile switching center 5, and wire speech paths 11 and 14. Mobile switching center 5 notifies mobile switching center 4 of effecting switching to the new mobile switching center 18. As a result mobile switching center 4 determines and sets up wire speech path 17 for mobile switching center 18, and then instructs mobile switching center 18 to connect with base station 20. Mobile switching center 18 determines and sets up wire speech path 19 for base station 20. Radio zone area 20 determines an idle radio speech channel 21 in radio zone area 22, and notifies mobile switching center 4 of it via mobile switching center 18 after the new radio speech channel 21 is ready for transmission and reception of signals from mobile station 1. Upon receiving the information as to idle radio speech channel channel 21 mobile switching center 4 controls communication path switch 15 so as to release the connection between wire speech paths 11 and 14, and connect wire speech paths 11, 17 and 14 with multi-connecting device 16. By the connection with multi-connecting device 16 signals transmitted from telephone 6 are distributed to wire speech paths 17 and 11, and signals to be transmitted through wire speech paths 19 and 10 to telephone 6 are added for subsequent transmission to wire speech path 14.

Next, mobile switching center 4 informs base station 3 of the new radio speech channel 21 which is in turn relayed to mobile station 1 via the old radio speech channel 9. As a result mobile station 1 changes its radio speech channel from the old radio speech channel 9 to the new radio speech channel 21. At this time, mobile station 1 is connected to telephone 6 via speech radio channel 21, wire speech paths 19 and 17, multi-connecting device 16, and wire speech path 14 so that a conversation is held between mobile station 1 and stationary telephone 6.

After mobile station 1 is changed to radio speech channel 21, base station 20 detects the radio speech channel switching completion, which is in turn relayed to mobile switching center 4 via mobile switching center 18. Consequently, mobile switching center 4 controls communication path switch 15 to release multi-connecting device 16, connect wire speech path 14 to wire speech path 17, and interrupt wire speech path 11. Base station 3 releases the old radio speech channel 9 when mobile speech channel exchange 5 releases wire speech path 10.

Figure 5:
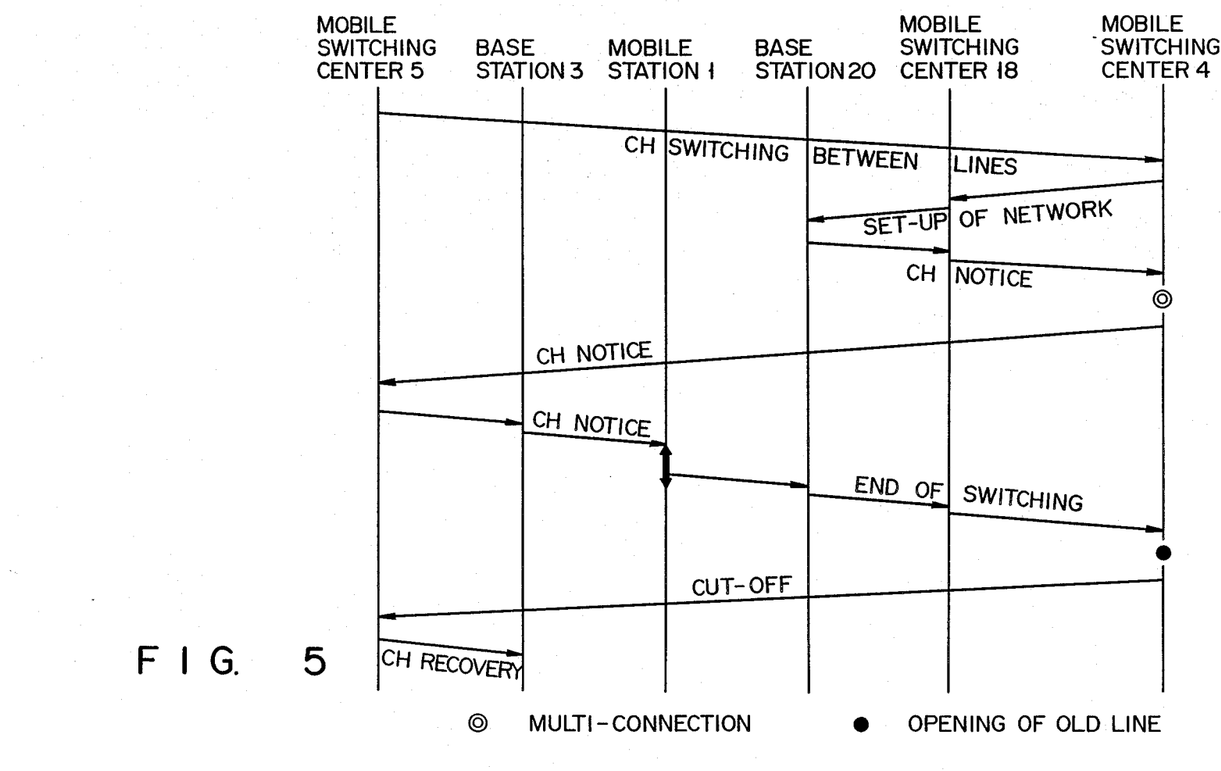
FIG. 5 shows a control sequence for handover in connection with a third operational case in the mobile communication system of FIG. 2.

To summarize the handover system in the third case, the mobile station further moves to a new radio zone area accommodated by a separate mobile switching center after the handover as in the first case has been completed with the result that the handover is effected again. This is noticed by the former mobile switching center to the first mobile switching center shown in the first case. Subsequently, the first mobile switching center multi-connects the wire speech path between the destination mobile switching center and the first mobile switching center and the wire speech path between the former mobile switching center and the first mobile switching center. And the mobile station changes its radio speech channel from the radio speech channel in the former radio zone area to the radio channel in the destination radio zone area without interrupting its communication. The control sequence for the third case is shown in FIG. 5.

In the third case as described above the multi-connection is achieved in the first mobile switching center, thus reducing the communication cut-off time. The third case provides an advantage that the wire speech path between the first mobile switching center and the destination mobile switching center alone suffices for a wire speech path which is used after the channel switching over the three mobile switching centers.

(The fourth case)

Figure 6:
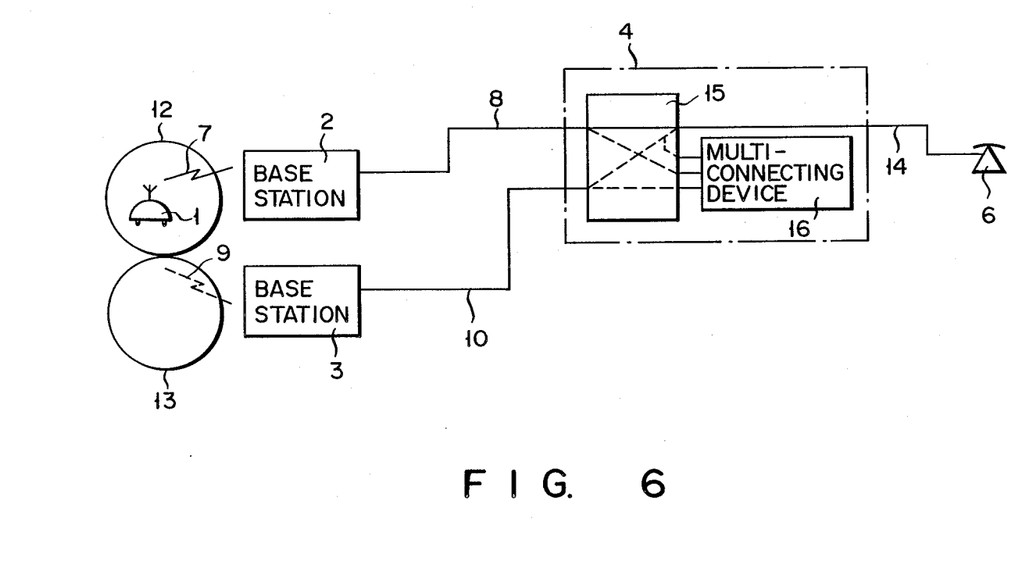
FIG. 6 is a block diagram for explaining another embodiment of the mobile communication system of this invention.

This is the case where, as shown in FIG. 6, mobile station 1 moves from radio zone area 12 to radio zone area 13 while maintaining communication, and both the radio zone areas are accommodated by mobile switching center 4.

That is, in this fourth case, radio zone area 13 and base station 3 are determined by means of existing techniques when mobile station 1 moves from radio zone area 12 to radio zone area 13 while communicating with stationary telephone 6 via radio speech channel 7, base station 2, wire speech path 8, mobile switching center 4, and wire speech path 14. Mobile switching center 4 determines and sets up wire speech path 10 to base station 3. Base station 3 determines an idle radio speech channel 9 in radio zone area 13, and then relays information on the idle radio speech channel 9 to mobile switching center 4 after the new radio speech channel 9 is ready for transmission and reception of signals from mobile station 1. Upon reception of the information on the idle radio speech channel 9 mobile switching center 4 controls communication path switch 15 in order to release the connection between wire speech paths 8 and 14, and to connect wire speech paths 8 and 11 and 14 to multi-connecting device 16.

Mobile switching center 4 informs base station 2 of the new radio speech channel 9 which is in turn relayed to mobile station 1 via the old radio speech channel 7. As a result mobile station 1 changes its radio speech channel from the old radio speech channel 7 to the new radio speech channel 9. At this time, mobile station 1 is connected to telephone 6 via radio speech channel 9, wire speech path 10, multi-connecting device 16, and wire speech path 14 so that a conversation is held between mobile station 1 and stationary telephone 6.

Figure 7:
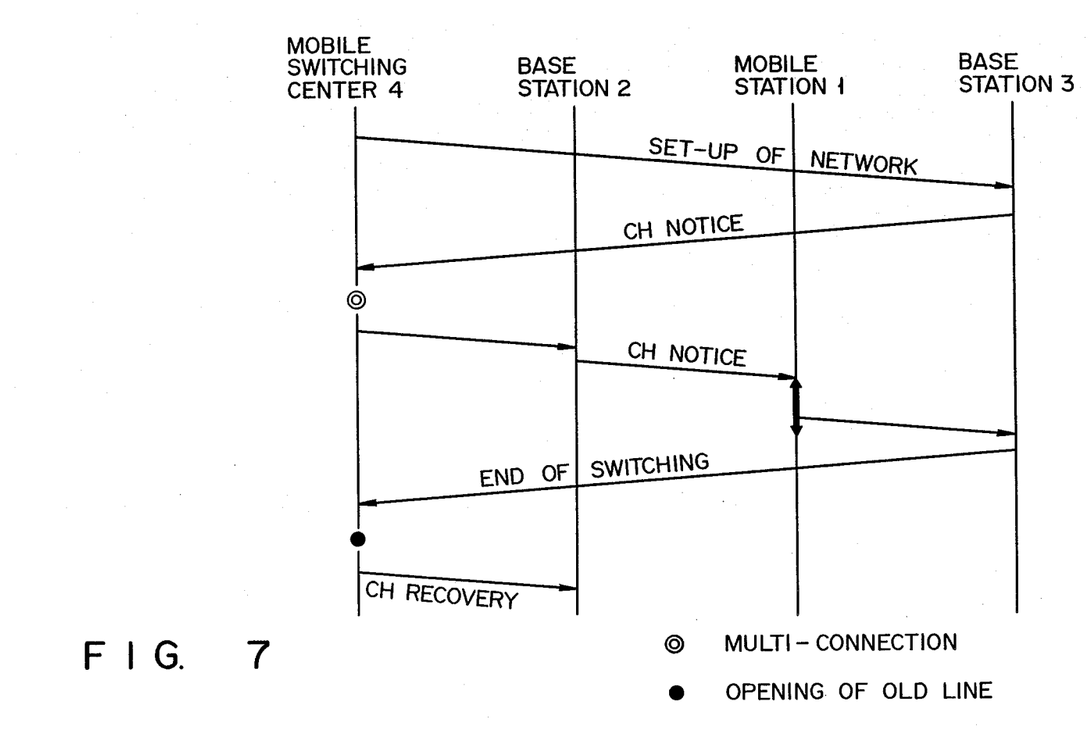
FIG. 7 shows a control sequence for explaining an operational case in the mobile communication system shown in FIG. 6.

When mobile station 1 changes its radio speech channel to radio speech channel 9, base station 3 detects the handover completion, which is in turn noticed to mobile switching center 4 via mobile switching center 5. Consequently, mobile switching center 4 controls communication path switch 15 to release multi-connecting device 16, connect wire speech path 14 to wire speech path 10, and interrupt wire speech path 8. Base station 2 releases the old radio speech channel 7. The control sequence of the fourth case is shown in FIG. 7.

As will be evident from the fourth case as described above, according to the handover system of this invention, the radio speech channel is switched while maintaining the condition capable of communicating with a telephone subscriber by the use of either the present radio speech channel or the new radio speech channel. Thus, this invention provides an advantage that the communication is not interrupted after the radio speech channel has been switched.

With the above described four operational cases the channel switching control is achieved by the multi-connecting device included in the mobile switching center that is connected to the base station having the channel which is on communication before the mobile station moves. Alternatively, the switching control may be carried out by the multi-connecting device in the mobile switching center connected to the base station of the destination of the mobile station.

Figure 8:
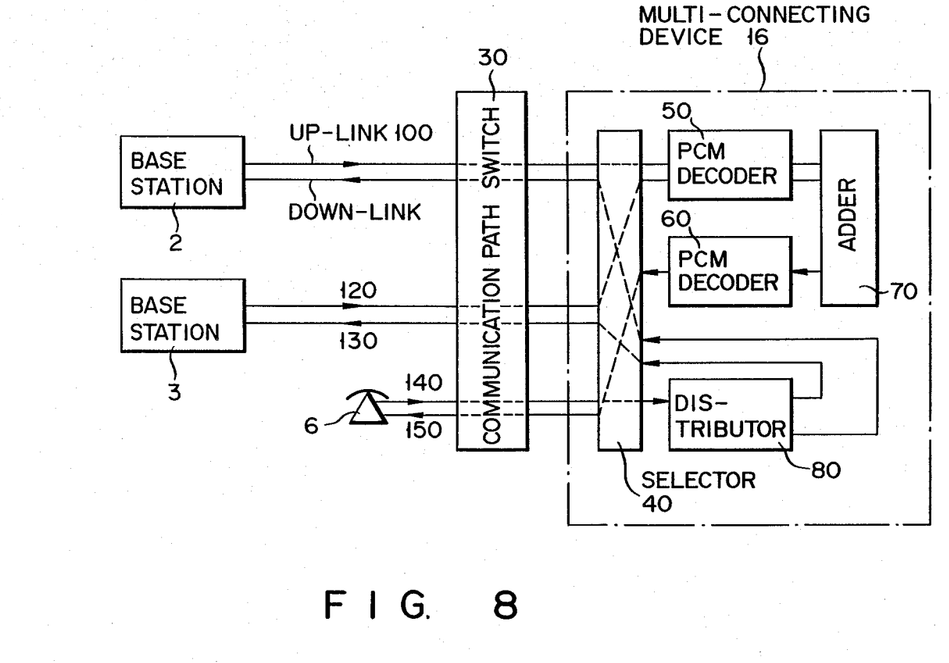
FIG. 8 shows a practical arrangement of a multi-connecting device of FIG. 2.

Referring now to FIG. 8, a practical arrangement of the multi-connecting device shown in FIGS. 2 and 6 will be described.

In FIG. 8, a up-link 100 of base station 2 and a up-link 120 of base station 3 are connected to multi-connecting device 16 via communication path switch 30 in the mobile exchange. In multi-connecting device 16 signals on up-links 100 and 120 are selectively applied by a selector circuit 40 to a PCM decoder 50. Consequently, PCM signals on links 100 and 120 are decoded to linear codes which are in turn applied to an adder 70. Adder 70 adds the linear codes together and the resultant output is in turn applied to a PCM coder 60 to be converted to a PCM signal. This PCM signal is transferred to a down-link 150 of telephone 6 via communication path switch 30. It will be understood that speech signals transmitted from base stations 2 and 3 are added together and then fed to telephone 6 by multi-connecting device 16.

On the other hand, a up-link 140 of telephone 6 is connected to multi-connecting device 16 via path switch 30. A speech PCM signal on up-link 140 is applied to a distributor 80 via selector 40. Distributor 80 distributes the PCM signal to two output lines. The distributed PCM signals are fed via selector 40 and path switch 30 to down-link 110 of base station 2 and down-link 130 of base station 3, respectively. Thus, it will been seen that the signals from telephone 6 are distributed to base stations 2 and 3.

The above example shows an arrangement of the multi-connecting device that can be applied to a digital exchange. However, a three-party communication equipment used in an analog exchange or a multiconnecting device having the same function as the above example may be used instead.

What is claimed is:

1. A method of switching a radio speech channel during communication in a mobile communication system comprising a plurality of mobile switching centers for accommodating through respective networks a plurality of base stations each having an independent radio zone area, said mobile switching centers being connected to each other through a wire speech path and to a telephone through a wire speech path; a mobile station connectable to each of said base stations through a radio speech channel; and multi-connecting means included in said mobile switching center for multi-connecting, during communication of the mobile station, a wire speech between the mobile switching center and an old or first base station left by the mobile station during communication, a wire speech path over which the said mobile switching center is to be coupled to a new or destination base station through a destination mobile switching center, and a wire speech path between the mobile switching center and the telephone; the method comprising:

detecting by said mobile switching centers when said mobile station moves across adjacent radio zone areas of two base stations during communication, a radio speech channel in the destination radio zone area through the destination base station as a channel change;

multi-connecting by said multi-connecting means in the first mobile switching center a wire speech path between said first mobile switching center and the old base station and a wire speech path over which the said first mobile switching center is to be coupled to the new base station through a second mobile switching center and the new base station and wire speech path between the mobile switching center and the telephone after the detection of the radio speech channel as handover; and switching the radio speech channel to be used by said mobile station from the radio speech channel in the old zone area to the radio speech channel in the new zone area while keeping the communication condition of said mobile station.

2. The method of claim 1, wherein said telephone is a fixed telephone.

3. The method of claim 1, wherein said telephone is a mobile telephone station.

4. The method of claim 1, wherein said mobile switching center comprises at least first and second mobile switching centers, and further comprising the steps of:

detecting by said first mobile switching center when said mobile station moves from the new zone area back to the radio zone area of the old base station, the radio speech channel in the old zone area as channel change-back;

multi-connecting by said multi-connecting means after the detection of the radio speech channel as the channel change-back, a line over which said first mobile switching center is to be coupled to the new base station through a second mobile switching center, a wire speech path connected to said old base station and a wire speech path connected to said telephone as a communication partner of said mobile station; and switching from the radio channel in the radio zone area of the new base station back to the radio speech channel in the radio zone area of the previous base station while keeping the communication condition of said mobile station.

5. The method of claim 4, wherein said telephone is a fixed telephone.

6. The method of claim 4, wherein said telephone is a mobile telephone station.

7. The method of claim 1, wherein said mobile switching center comprises at least first, second and third mobile switching centers, and further comprising the steps of:

detecting by said mobile switching center when said mobile station moves during communication from the new zone area to the radio zone area of a further destination base station, the radio speech channel in the further destination zone area as a new handover through said further destination base station;

multi-connecting by said multi-connecting means after the detection of the new channel change, a wire speech path over which said first mobile switching center is to be coupled to said old base station through a second mobile switching center, a wire speech path to be coupled to said further destination base station through a third mobile switching center and a wire speech path connected to said telephone as a communication partner of said mobile station; and switching from the radio speech channel in the radio zone area of said new base station to a radio speech channel in the radio zone area of said further destination base station.

8. The method of claim 7, wherein said telephone is a fixed telephone.

9. The method of claim 7, wherein said telephone is a mobile telephone station.

* * * * *